July 5, 1932. H. T. CHANDLER 1,866,293
VALVE FOLLOWER
Original Filed Feb. 3, 1928  2 Sheets-Sheet 1
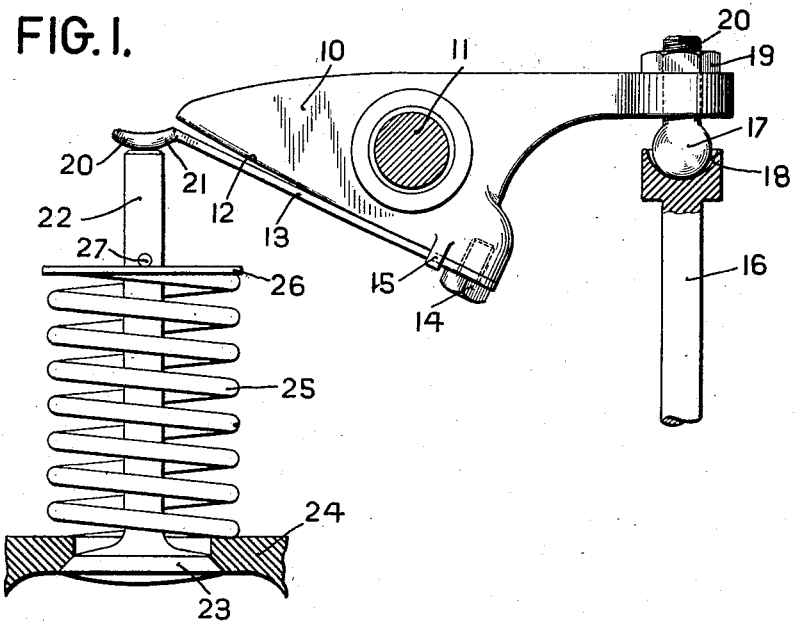
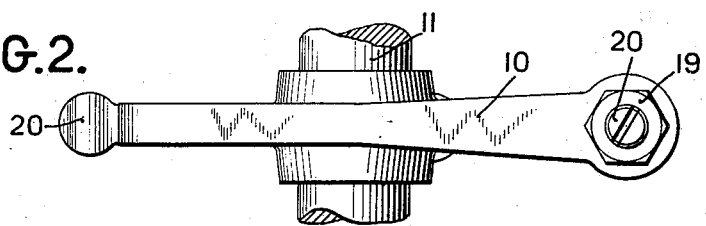
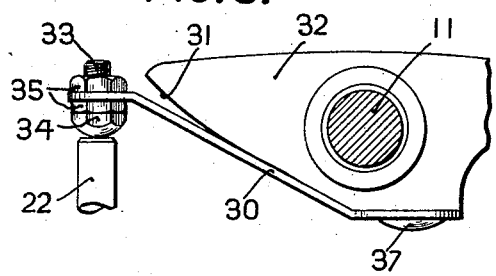
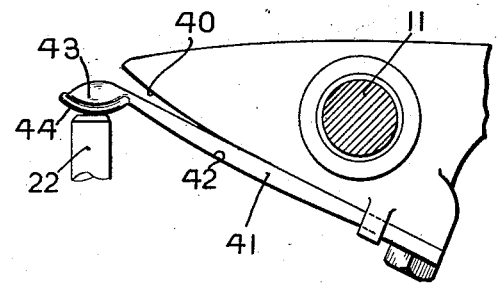
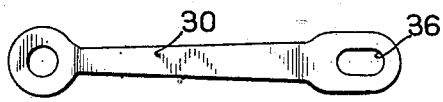
Inventor
Henry T. Chandler
By his Attorney
Albert M. Austin July 5, 1932.  H. T. CHANDLER  1,866,293
VALVE FOLLOWER
Original Filed Feb. 3, 1928   2 Sheets-Sheet 2

Inventor
Henry T. Chandler
By his Attorney
Albert M. Austin

Patented July 5, 1932

1,866,293

UNITED STATES PATENT OFFICE

HENRY T. CHANDLER, OF NEW YORK, N. Y.

VALVE FOLLOWER

Application filed February 3, 1928, Serial No. 251,507. Renewed April 5, 1930.

This invention relates to a valve mechanism, and more particularly, to a rocker arm or follower for operating a valve in accordance with a rotating cam.

The valves in internal combustion engines, are commonly held in closed position by means of a valve spring and are opened by a rotating cam and suitable mechanical connecting links, such as a tappet, push rod, rocker arm, etc., which work against the spring pressure. Due to the inherent expansion and contraction of these parts when the motor becomes heated, it is impractical to operate the valve push rods without a certain amount of clearance when in closed position. The clearance is dependent upon the temperature of the engine and also upon the condition of wear of the various parts. Hence it cannot be readily maintained constant for any considerable length of time.

The valves are positively opened but in closing the spring is relied upon to cause the valve to follow the cam. At high speeds, the spring may be unable to do this in a satisfactory manner and may allow the valve to lag behind the cam by such an amount that the valve gathers considerable momentum which must be taken up by the valve seat. If the valve spring is made too strong in an effort to cause the valve to follow the cam at high speeds, the pressure of the valve on the valve seat would cause injury to the parts. If on the other hand, the spring is too weak the valve will not seat properly and will lag considerably behind the cam in closing.

Various disagreeable results are inherent in the above described valve mechanism largely by reason of the variable clearance between the parts and the difficulty of maintaining a constant adjustment. Obviously if the clearance is too small the valve would not seat properly whereas if it is too great a disagreeable pounding would result which would tend to injure the contacting surfaces.

In an operating valve mechanism, various inertia forces are encountered both in starting the valve from rest when opening and again in stopping the valve in contact with the valve seat. When a clearance is provided between the operating parts, the lift of the cam is able to attain a certain speed before making contact with the cam follower and initiating the opening movement of the valve. As a result the valve must be started from rest and instantaneously brought to a speed corresponding to that of the cam lift.

Also in closing, due to the variable clearance, it is impossible to decelerate the valve to zero velocity at the instant of seating by means of the cam. The inertia forces in such a case are considerable and frequently cause injury to the various contacting surfaces, especially after continued operation.

The present invention utilizes the normal valve clearance, which has heretofore been considered to have only a detrimental effect, to gradually build up the forces necessary to cause opening and seating, thus preventing the various contacting surfaces from injury.

In accordance with the present invention, a rocker arm is employed for interconnecting the cam follower and the valve stem in such a manner that the parts are always in contact. The rocker arm is composed of a solid cross arm and a spring member carried thereby, which is capable of exerting a sufficient pressure upon the parts for holding the cam follower in contact with the cam while permitting the valve driving mechanism to undergo the changes in dimensions which normally result in a variable clearance. A variable line of contact is made between the rocker arm and the spring member which enables the force exerted by the spring to be varied as any desired function of the displacement.

The invention also consists in certain new and original features of construction and combinations of parts hereinafter set forth and claimed.

Although the novel features which are believed to be characteristic of this invention will be particularly pointed out in the claim appended hereto, the invention itself, as to its objects and advantages, the mode of its operation and the manner of its organization may be better understood by referring to the following description taken in connection with the accompanying drawings forming a part thereof, in which Fig. 1 is a side elevation of a valve mechanism constructed in accordance with this invention;

Fig. 2 is a plan view thereof;

Fig. 3 is an elevation of a modified form in which the rocker arm contacting surface is in the form of an arc and the spring is of uniform thickness;

Fig. 4 is a plan view of the spring shown in Fig. 3;

Fig. 5 is a modification in which the rocker arm is arcuate and the spring parabolic;

Like reference characters denote like parts in the several figures of the drawings.

Figure 6:
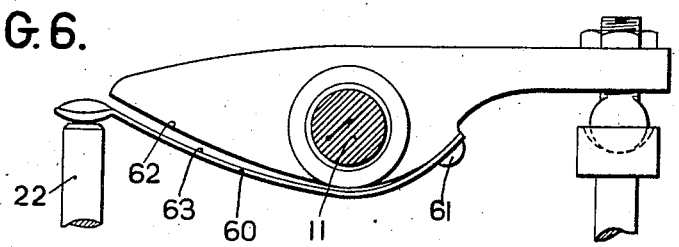
Fig. 6 is an elevation of a further modification.

In the following description and in the claim parts will be identified by specific names for convenience, but they are intended to be as generic in their application to similar parts as the art will permit.

Referring to the drawings more in detail, Fig. 1 discloses a rocker arm formed of a rigid cross bar 10 journalled upon rod 11. A lower surface 12 of cross bar 10 is in parabolic form and contacts with a spring member 13 of uniform cross section. Member 13 is secured at one end to cross bar 10 as by nut 14 and is prevented from rotating by suitable means as by lug 15 which may be formed as an integral part of cross arm 10 and bent about the sides of said spring. Push rod 16 cooperating with a driving cam (not shown) is adjustably associated with rocker arm 10 as by ball 17 cooperating with a spherical socket 18 carried on said push rod. Ball 17 is formed as a part of a screw rod 20 which is in threaded engagement with cross arm 10 and secured thereto by lock washer 19.

Spring 13 may be formed with a distorted end section 20 having a partial cylindrical surface 21 adapted to contact with valve stem 22. Valve 23, secured to stem 22, is normally held in engagement with valve seat 24 by valve spring 25. Spring 25 is compressed between valve seat 24 and plate 26 which may be secured to valve stem 22 as by pin 27.

The relationship of the parts is preferably such that the center of rod 11 and the effective centers of contact of the rocker arm with cam follower 16 and with valve stem 22 lie in substantially a straight line which is perpendicular to the valve stem and cam follower when the valve is in its half open position. The lateral movement of the contacting surfaces is reduced to a minimum by this expedient and the operating friction minimized.

Spring 13 may be formed throughout of a uniform thickness and the upper surface thereof ground to the desired contour. This will reduce the thickness of the flat portion of the spring while leaving head 20 of an increased thickness thereby preventing distortion of the head due to the operating forces.

The parabolic contour of surface 12 is so designed that the clearance between the end of said surface and the end of spring 13 is greater than that which is likely to occur in the operating mechanism. As a specific example, a clearance of .050" would operate properly with an internal combustion engine having a normal clearance between the valve stem and the cam shaft of .012". In such a case the device would be set with the valve closed to have a clearance of approximately .025" between the spring 13 and arm 10. This adjustment can be readily obtained by placing a gauge between the spring and cross arm and adjusting screw 20 and lock nut 19.

Spring 13 should be further designed so that, when set as above, the force thereof is less than that of the valve spring 25. For example, with a valve spring capable of exerting a seating force of 50 lbs. spring 13 could exert a force of 30 lbs. When the valve is closed. The distance over which the spring would take effect in one direction is limited to the difference between .012" and .050" or equals .038", the distance by which it has been distorted in setting. The spring is limited in backward movement by the surface 12, becoming in effect a solid bar when in full contact therewith.

When the rocker arm is operated to open valve 23, spring 13 will be first depressed until the built up resistance exceeds that of spring 25 and the inertia force of the valve. In so depressing the upper surface of spring 13 it is brought into a variable contacting relationship with parabolic surface 12 of rocker arm 10, the outer point of contact moving toward the free end of spring 13 until the required resistance is obtained. Should this resistance be insufficient to open valve 23 against the action of spring 25, the load would then be taken up by rocker arm 10 and the valve positively opened. There is no abrupt point of contact, however, which could cause the parts to become worn or produce a sudden change in velocity.

The mechanism as above described will operate to open the valve in accordance with the contour of the cam. When the valve is closed, however, the lag between the valve stem and the cam will be taken up by spring 13 which is of sufficient strength to cause the cam follower to remain in close contact therewith. When the cam has reached its lowermost position, however, and the valve is about to seat, the force of spring 13 will oppose that of spring 25 and gradually decelerate the valve before seating.

The force exerted by spring 13 in its various positions may be controlled and made of any desired value by varying the contour of the contacting surfaces of the rocker arm and spring and by varying the cross section of the spring. Considering a spring of uniform cross section by way of example, the free cantilever section of the spring is varied from approximately the full length of the spring to an extremely short length as the force is gradually increased from a minimum to a maximum. The change in length of the cantilever arm varies the opposing force exerted by the spring in the manner well known in the art of mechanics. This rate of change of the point of contact may be constant or may be varied in any desired manner by changing the shape of the contacting surfaces.

As a specific example, the rocker arm may be formed with a parabolic surface with a sharper curvature at the free end. In this case, the spring could be made to gradually build up the pressure to overcome the force of the valve spring and cause the valve to open and could then be made to rapidly increase in order to overcome the inertia forces of the moving parts. The first part of surface 12 may be formed to gradually build up pressure to compensate for valve expansion and a second portion may control the valve acceleration.

These results may be also obtained by changing the cross section of the spring member whereby the force exerted by different lengths of cantilever may be any desired function of the cantilever length. This rate of change may, of course, be uniform or irregular as the particular conditions require, in order to enable the mechanism to control the acceleration and deceleration of the valve without causing excessive wear on either the came surface or the valve seat.

The spring characteristics are dependent upon (1) length, (2) rate of change of cross section, (3) rate of change of moment of inertia of cross section, (4) curvature of limiting surface. Various combinations of these factors may be used to produce any desired condition.

Various modifications may be made in the above described rocker arm, an essential feature being a spring which will have a certain stress distribution and contacting surfaces which provide a variable contact as the spring pressure is altered. The condition shown in Fig. 1 is that of a spring of uniform cross section contacting with a parabolic surface. In Figs. 3 and 4 spring 30 is shown of uniform thickness but of variable width whereas the contacting surface 31 of rocker arm 32 is of arcuate formation. The extremity of spring 30 is bent at right angles to valve stem 22 and is drilled to receive the bolt 33 having a contacting head 34 and adjusting screws 35. Spring 30 is also shown as bent to a substantially horizontal position at its lower end and riveted to cross arm 32 in order to reduce the overall thickness of the mechanism. The spring may be formed with an oval hole 36 cooperating with rivet 37 in order to prevent lateral turning thereof. The taper of spring 30 should be such as to provide a spring having the desired stress distribution.

In the modification shown in Fig. 5, a cross arm is provided with a circular surface 40. The cooperating portion of the spring 41 is formed with a straight surface and the back portion of spring 41 is formed with a parabolic surface 42. The parabolic surface, as is well known in mechanical design, causes the spring to have a uniform stress throughout its length. The ends of spring 41 may be upset to provide a thickened portion 43 which may be suitably rounded or otherwise formed to provide a bearing surface 44 for the push rod 22. The bearing surface may be hardened to reduce wear.

In the modification shown in Fig. 6 the total thickness of the rocker arm is decreased by passing spring 60 under the hub portion and attaching the same on the opposite side of said hub, as by rivet 61. The cooperating surfaces 62 and 63 should be ground to a suitable contour to permit a moving line contact to be obtained throughout substantially the entire length of spring 60 as force is applied thereto by valve stem 22. A rocker arm of this type will be desirable in cases where the clearance between shaft 11 and the motor top is comparatively small.

Figure 7:
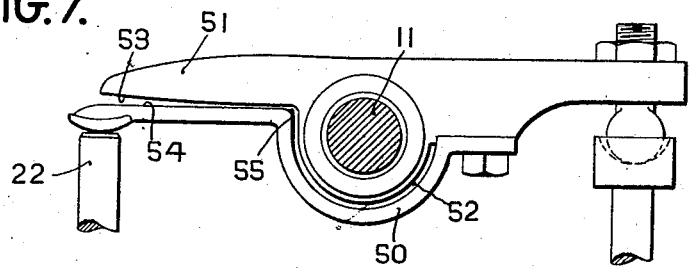
Fig. 7 is an elevation of a form of valve mechanism in which a wiping contact is obtained between the spring and the rocker arm.

In Fig. 7 is shown an arrangement whereby a long spring 50 is provided. Spring 50 is bent around the hub portion of arm 51 and attached on the opposite side of said hub member from push rod 22. A space 52 is provided around said hub member to prevent the spring from coming in contact therewith. Surface 53 of arm 51, and surface 54 of said spring are ground to have a variable contact of the type above described. The heel portion 55 of said spring member will make a wiping contact with surface 53 which will be comparatively silent whereas the extreme length of spring permits the necessary resiliency to be obtained.

Figure 8:
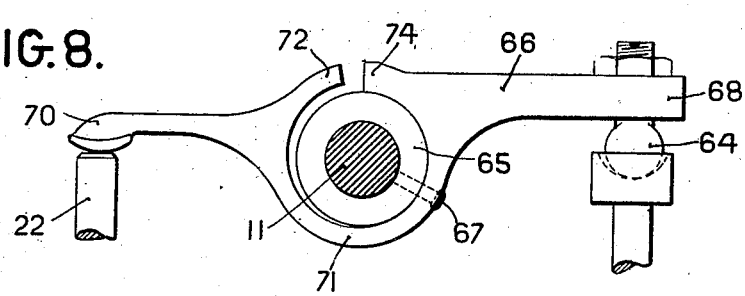
Fig. 8 is an elevation of a rocker arm formed of a single piece of metal.

In the modification shown in Fig. 8 a sleeve 65 is rotatably secured to shaft 11 and rocker arm 66 is rigidly secured to said sleeve as by pin 67. Rocker arm 66 is provided with a rearwardly extending portion 68 fitted with suitable mechanism such as bolt 69 for contacting with the cam follower rod and with a forwardly extending portion 70 adapted to contact with the valve stem 22. Portions 68 and 70 are joined by resilient member 71 which is formed with a suitable inner contour to progressively contact with sleeve 65 when force is applied to arm 70. Cooperating extensions 72 and 74 may be formed on sections 68 and 70 respectively to permit a gauge to be employed for adjusting the clearance of the parts. Extensions 70 and 72 are preferably formed so that a space is at all times provided therebetween in order to prevent a sudden contact being made due to flexure of the parts. The rocker arm, however, operates in the manner described above, the varying line contact around sleeve 65 being employed for taking up the clearance between the parts in operation.

Figure 9:
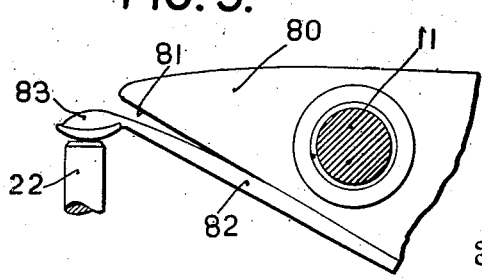
Fig. 9 is a partial elevation of a rocker arm having a straight contacting surface and a spring having a uniform resistance.

Fig. 9 illustrates a further combination which may be employed to obtain a bar of uniform stress and a variable line contact. In this figure, rocker arm 80 is provided with a straight edge 81 and the cooperating portion of spring 82 is of a parabolic formation. The end portion of spring 82 is thickened to provided a head 83 suitable for contacting with valve stem 22.

While the various cooperating surfaces described herein represent possible embodiments, it is obvious that with the slight clearances which are employed and consequently the short angular segments, the surfaces may take the form of various other curves which will approximate in operation the parabolic surface contacting with a bar of uniform stress.

In the drawings accompanying and forming part of this specification, a practical commercial embodiment of the invention is shown, but as such illustration is primarily for purposes of disclosure, it will be understood that the structure may be modified in various respects without departure from the broad spirit and scope of the invention as hereinafter defined and claimed.

What is claimed is:

A valve operating mechanism comprising a rotatable cam, a cam follower cooperating therewith, a valve stem and means for interconnecting said valve stem and said cam follower comprising a rocker arm, a supporting rod therefor, means for pivotally mounting said rocker arm thereon, adjustable means for operating said rocker arm in accordance with said cam follower, a spring member secured to said rocker arm, said spring member and rocker arm having cooperating surfaces of different curature whereby the area of contact may be varied as a function of the force being transmitted, means for operating said valve stem in accordance with said spring member comprising a cylindrical segment secured to said spring at the free end thereof, said spring extending below the supporting rod whereby the free portion thereof comprises more than half the length of said rocker arm, said spring being adapted to compensate for the expansion and contraction of the operating elements and to cause said valve to gradually seat and unseat whereby the normal valve clearance is used to reduce the momentum of said valve.

In testimony whereof I have hereunto set my hand.

HENRY T. CHANDLER.